United States Patent
Madge et al.

(10) Patent No.: US 7,621,843 B2
(45) Date of Patent: Nov. 24, 2009

(54) APPARATUS FOR RESTRAINING AXIAL MOVEMENT OF A RING GEAR IN A GEARBOX FOR A WIND TURBINE

(75) Inventors: James H. Madge, Erie, PA (US); Khanh Khac Do, Erie, PA (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 11/673,026

(22) Filed: Feb. 9, 2007

(65) Prior Publication Data

US 2008/0171630 A1 Jul. 17, 2008

(51) Int. Cl.
*F16H 57/08* (2006.01)
(52) U.S. Cl. .................................................. 475/346
(58) Field of Classification Search ................ 475/346
See application file for complete search history.

(56) References Cited

U.S. PATENT DOCUMENTS

| | | | | |
|---|---|---|---|---|
| 2,968,922 | A | * | 1/1961 | Gilbert ...................... 60/39.5 |
| 3,289,488 | A | * | 12/1966 | Breuer ......................... 74/410 |
| 3,459,072 | A | * | 8/1969 | Shannon ..................... 475/344 |
| 4,583,413 | A | * | 4/1986 | Lack ............................ 74/410 |
| 5,170,674 | A | * | 12/1992 | Williams et al. ............ 74/15.88 |
| 5,240,462 | A | * | 8/1993 | Mochizuki et al. .......... 475/342 |
| 5,391,125 | A | * | 2/1995 | Turra et al. .................. 475/346 |
| 5,433,674 | A | * | 7/1995 | Sheridan et al. ............. 475/346 |
| 5,663,600 | A | | 9/1997 | Baek et al. |
| 6,872,049 | B2 | | 3/2005 | Christensen |
| 6,888,262 | B2 | | 5/2005 | Blakemore |
| 6,951,443 | B1 | | 10/2005 | Blakemore |
| 7,004,724 | B2 | | 2/2006 | Pierce et al. |
| 7,008,348 | B2 | | 3/2006 | LaBath |
| 7,011,598 | B2 | | 3/2006 | Flamang et al. |
| 7,095,129 | B2 | | 8/2006 | Moroz |
| 2005/0250611 | A1 | | 11/2005 | Jurado et al. |
| 2006/0063630 | A1 | | 3/2006 | Jurado |

\* cited by examiner

*Primary Examiner*—Dirk Wright
(74) *Attorney, Agent, or Firm*—Robert Wawrzyn, Esq.; Robert L. Wolter, Esq.; Beusse Wolter Sanks Mora & Maire, P.A.

(57) ABSTRACT

The gearbox may also comprise a retaining means comprising a retainer ring having a first leg fitted in mating relationship with the housing and a second leg depending there from and overlapping at least a portion of the ring gear. The retainer ring has two free ends spaced apart forming a gap there between. A keystone, mounted to the housing, has a first leg disposed between the gap in the retainer ring and disposed toward an input end of the gearbox, and a second leg attached to the first leg wherein the second leg is secured to the housing.

17 Claims, 7 Drawing Sheets

FIG. 8
PRIOR ART

APPARATUS FOR RESTRAINING AXIAL MOVEMENT OF A RING GEAR IN A GEARBOX FOR A WIND TURBINE

BACKGROUND OF THE INVENTION

The present invention relates to a wind turbine and, in particular, to a gearbox interposed between a rotor of a wind turbine and an electrical generator.

It is known to use a planetary gearbox to drive an electric generator in response to rotation of a rotor of a wind turbine. The rotor provides a low speed, high torque input to the gearbox. The gearbox provides a high speed, low torque output to the generator. This type of gearbox has been used in this application for approximately twenty years. Generally, planetary gear assemblies include a plurality of planet gears operatively connected at one end to a planet carrier. The planet gears engage and move within a ring gear that is a stationary or floating circular gear having inner diameter gear teeth. In addition, the planet gears are positioned in mating relationship with a sun gear, which rotates responsive to the rotation of the planet gears. Torque produced by the wind turbine rotor is transmitted into the gearbox through the planet carrier. Each stage of the three-stage gearbox increases the input speed and reduces the torque until the output speed matches the capability of a generator operatively connected to the gearbox.

During operation of the wind turbine, the gear configuration of the planet, ring and sun gears produces an axial thrust on the ring gear in an upwind direction or toward the rotor or input end of the gearbox. Under certain transient events, such as a mechanical or electrical failure that causes the wind turbine to suddenly shut down, the ring gear may experience an axial thrust or movement toward the output end of the gearbox. Gearboxes are typically adapted to restrain such axial movement and maintain alignment of the gears.

In some gearboxes the ring gear is simply affixed to the interior of the gearbox housing to restrain axial movement of the ring gear. In gearboxes that incorporate a "floating" ring gear design, the ring gear is not affixed directly to gearbox housing. With respect to FIG. 8, there is illustrated gearbox having a gearbox housing with an input housing 126 mounted to a middle housing 127. A planet gear 128 is supported on a planet carrier (not shown) and engaging the ring gear 129. The ring gear 129 includes a plurality of splines 130 disposed on the outside diameter of the ring gear 129, which splines 130 are positioned in mating relationship with internal splines 131 formed in the input housing 126. The internal splines 131 form a first lip 132 on the housing 126 that overlaps at least a portion of each spline 130 to restrain axial movement of the ring gear toward the input end of the gearbox 125. A second lip 133 that is formed at the junction of the input housing 126 and the middle housing 127 restrains movement of the ring 128 in the opposite direction.

Figure 8:
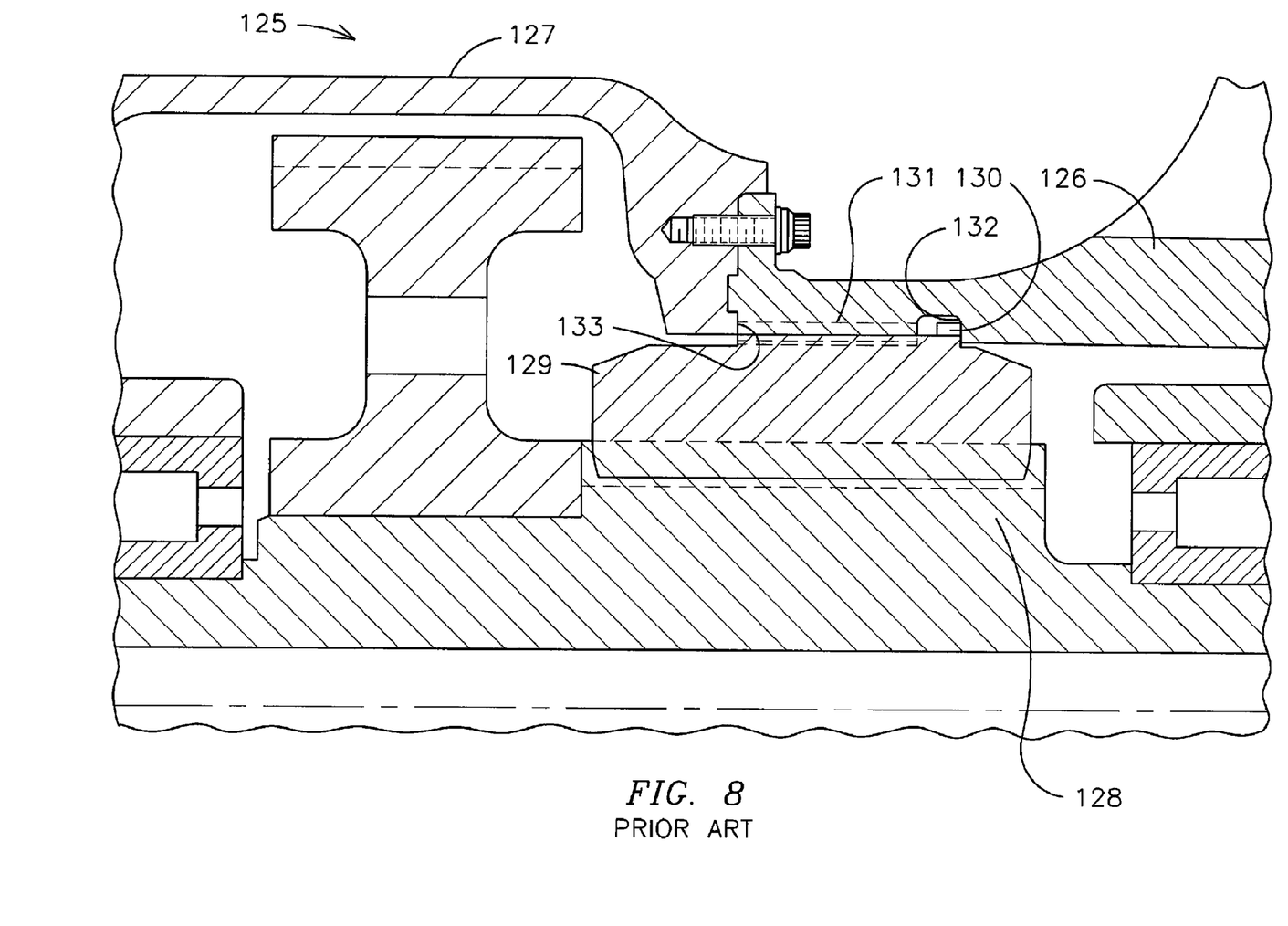
FIG. 8 is a sectional view of a prior art gearbox.

The components of the above-described gearbox are installed in a determined order. For example, the planet carrier is first installed in the input housing 126 then the ring gear 128 is mounted in the input housing 126 by mating the splines 130 on the ring gear 128 with the corresponding internal splines 131 formed on the interior of the input housing 126. The middle housing 127 is then mounted to the input housing 126. As described above the lip 133 formed at the junction of the input and middle housing restrains axial movement of the ring gear.

Gearboxes incorporating the above-described "floating" ring gear design and are not prior art, have been developed in which the input housing and middle housing are integrated as a single unit. However, if the middle housing portion of such an integrated unit has a lip at the junction of the input housing, the ring gear cannot be installed. Accordingly, a system or apparatus is necessary to restrain axial movement of a floating ring gear in a wind turbine gearbox that provides an effective installation of the ring gear.

BRIEF SUMMARY OF THE INVENTION

The present invention includes, by way of example, a gearbox having a housing within which a planet carrier having a central axis is mounted. The planet carrier, which is driven by a wind driven device such as a rotor blade, supports a plurality of planet gears. All of the planet gears mesh with and rotate relative to a ring gear about a central axis of the planet carrier and ring gear. In addition, all of the planet gears mesh with and drive a smaller sun gear, which rotates substantially about the central axis of the planet carrier. The sun gear drives a larger final stage gear, which is mounted on the sun gear by a splined connection. The final stage gear meshes with a smaller set of gear teeth on an output pinion and drives the output pinion faster than the sun gear.

The gearbox also comprises a means for restraining the axial movement of the ring gear in a direction toward an output end of the gearbox. The restraining means may comprise a retainer ring mounted to the gearbox housing adjacent to and overlapping at least a portion of the ring gear. In an embodiment, the retainer ring may have a first leg fitted in mating relationship with the housing and a second leg depending there from and overlapping at least a portion of the ring gear. The retainer ring has two free ends spaced apart forming a gap there between. A keystone, mounted to the housing, has a first leg disposed in the gap of the retainer ring and disposed toward an input end of the gearbox, and a second leg attached to the first leg wherein the second leg is secured to the housing.

The novel features of this invention, as well as the invention itself, will be best understood from the attached drawings, taken along with the following description, in which similar reference characters refer to similar parts, and in which:

BRIEF DESCRIPTION OF THE SEVERAL VIEWS OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
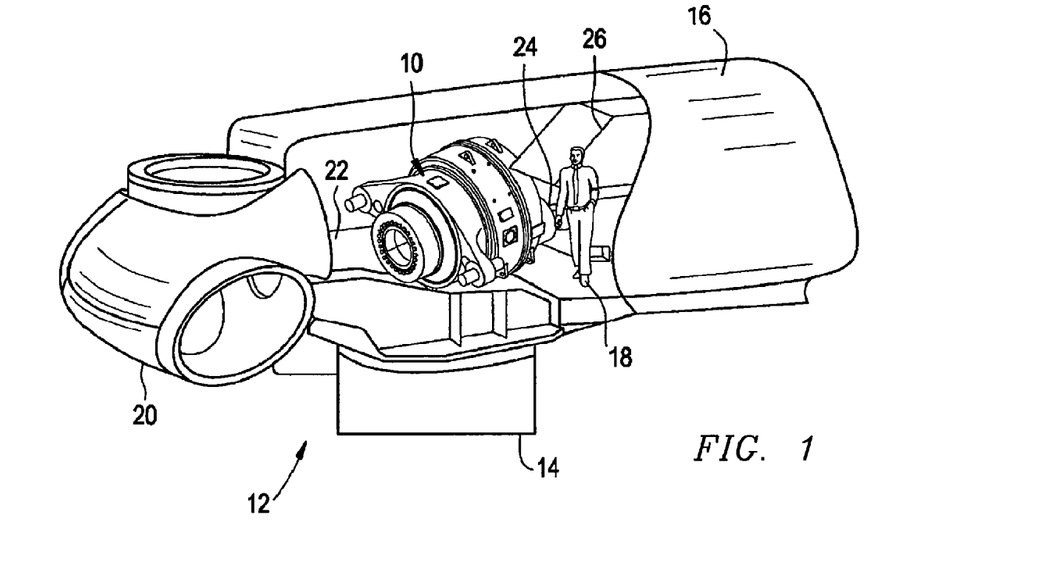
FIG. 1 is a cut-away illustration of a wind turbine that includes a gearbox in accordance with one embodiment of the invention.

The present invention relates to a wind turbine and, in particular, to a gearbox interposed between a rotor of a wind turbine and an electrical generator. The present invention is applicable to various gearbox constructions. FIG. 1 illustrates schematically a gearbox 10 in accordance with one embodiment of the invention. While the invention is described in the context of a compound planetary gear design, the invention may also be utilized with other planetary gear designs such as a simple planetary gear.

The gearbox 10 forms part of a wind turbine 12. The wind turbine 12 includes a support post or pylon 14. The pylon 14 supports a turbine housing 16. The gearbox 10 is supported in the turbine housing 16. The silhouette 18 of the person standing inside the wind turbine housing 16 indicates the size of the gearbox 10 schematically.

A rotor 20 is supported on the turbine housing 16 for rotation relative to the turbine housing. The rotor 20 is connected by a rotor shaft 22 to the input end of the gearbox 10. The output end of the gearbox 10 is connected by an output shaft 24 to a generator 26. The rotor 20 rotates in response to air movement past the wind turbine 12. The rotational force of the rotor 20 is transmitted through the rotor shaft 22, the gearbox 10, and the output shaft 24, to the generator 26. The generator 26 generates electricity.

Figure 2:
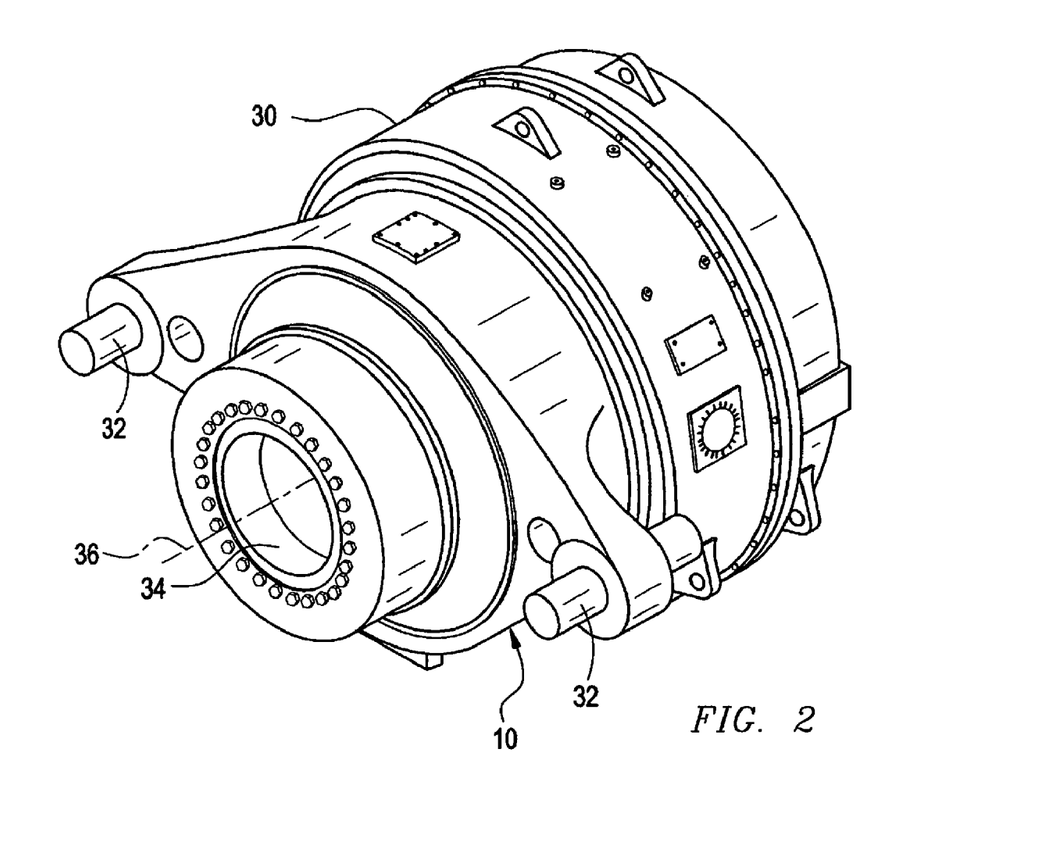
FIG. 2 is a perspective view of the input end of the gearbox of FIG. 1.
Figure 3:
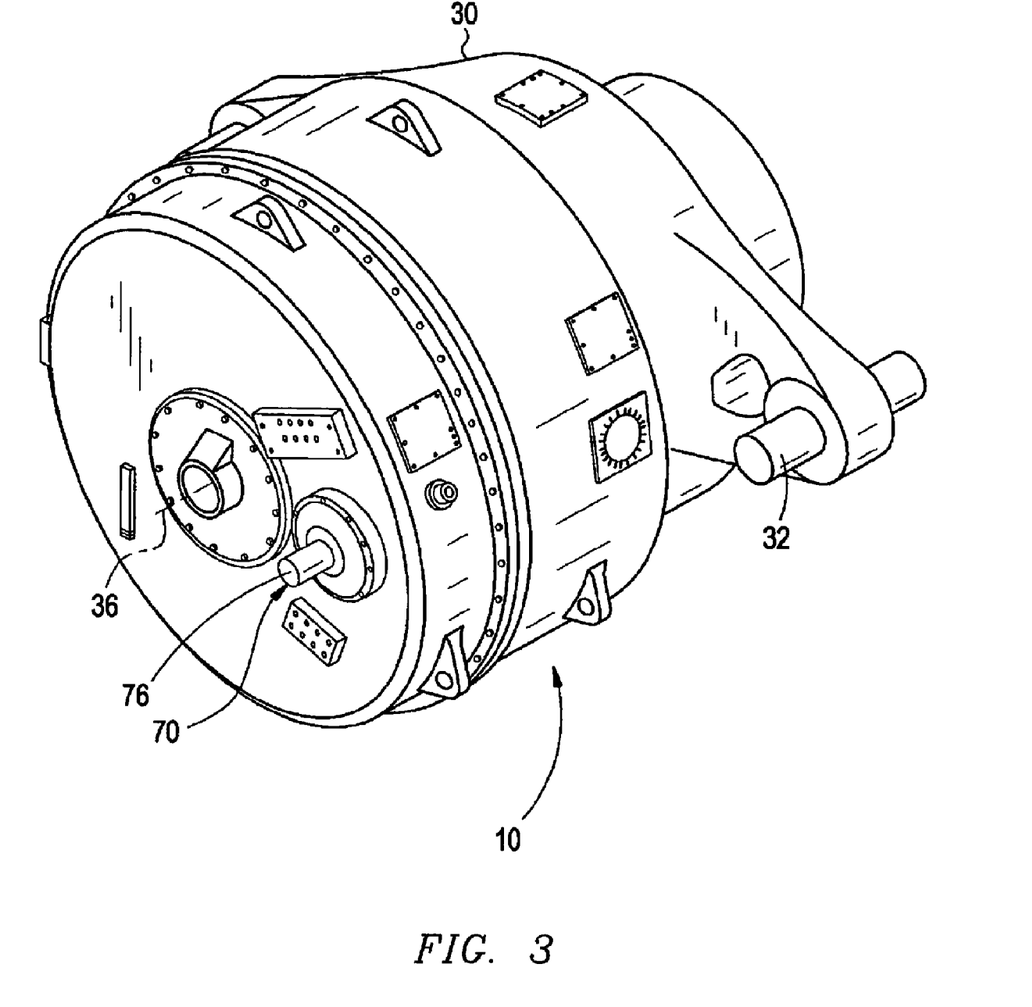
FIG. 3 is a perspective view of the output end of the gearbox of FIG. 1.

The gearbox 10 (FIGS. 2 through 4) includes a gearbox housing 30 that as illustrated is made of several components or covers that are detachably secured together. The gearbox housing 30, as illustrated, includes an input end cover 82, a planet gear cover 84, and a final stage cover 92. In the embodiment illustrate herein, the input end cover 82 and the planet gear cover are shown as in integral single unit; however, these components 82 and 84 may also exist as two separate components affixed to one another. The gearbox housing 30 is supported on the turbine housing 16 by support pins 32.

The input end cover 82 of the gearbox housing 30 extends around and supports a planet carrier 40 (FIG. 4), for rotation of the planet carrier 40 relative to the housing 30 about a central axis 36 of the planet carrier 40. An input hub 34 on a first end of the planet carrier 40 is coupled to the rotor shaft 22, in a suitable manner, not shown, for rotation with the rotor 20. The input hub 34 receives rotational force from the rotor 20 and rotates the planet carrier 40 relative to the gearbox housing 30 in response to that rotational force. The second end of the planet carrier 40, as illustrated, is substantially open, with a detachably mounted end plate 88 attached to the second end of the planet carrier 40. This removable carrier end plate 88 acts as a planet bearing support, as explained below.

The planet carrier 40 supports a plurality of planet pinions 42 therein for orbital movement about the carrier axis 36. In the illustrated embodiment, three planet pinions 42 are provided, spaced apart equally about the carrier axis 36. Only one planet pinion 42 is visible in FIG. 4. Bearings support the planet pinions 42 for rotation relative to the planet carrier. Specifically, a first planet bearing 46, mounted at the first end of the planet carrier 40, engages and supports a first end of each planet pinion 42, supporting that end of the planet pinion 42 directly from the planet carrier 40. A second planet bearing 48, which is mounted on the planet carrier end plate 88, engages and supports a second end of each planet pinion 42, thereby supporting the second end of the planet pinion 42 indirectly from the planet carrier 40. Each one of the planet pinions 42 has a plurality of external gear teeth 44 which, in the illustrated embodiment, are spur gear teeth. The planet pinion gear teeth 44 can alternatively be helical gear teeth.

Figure 4:
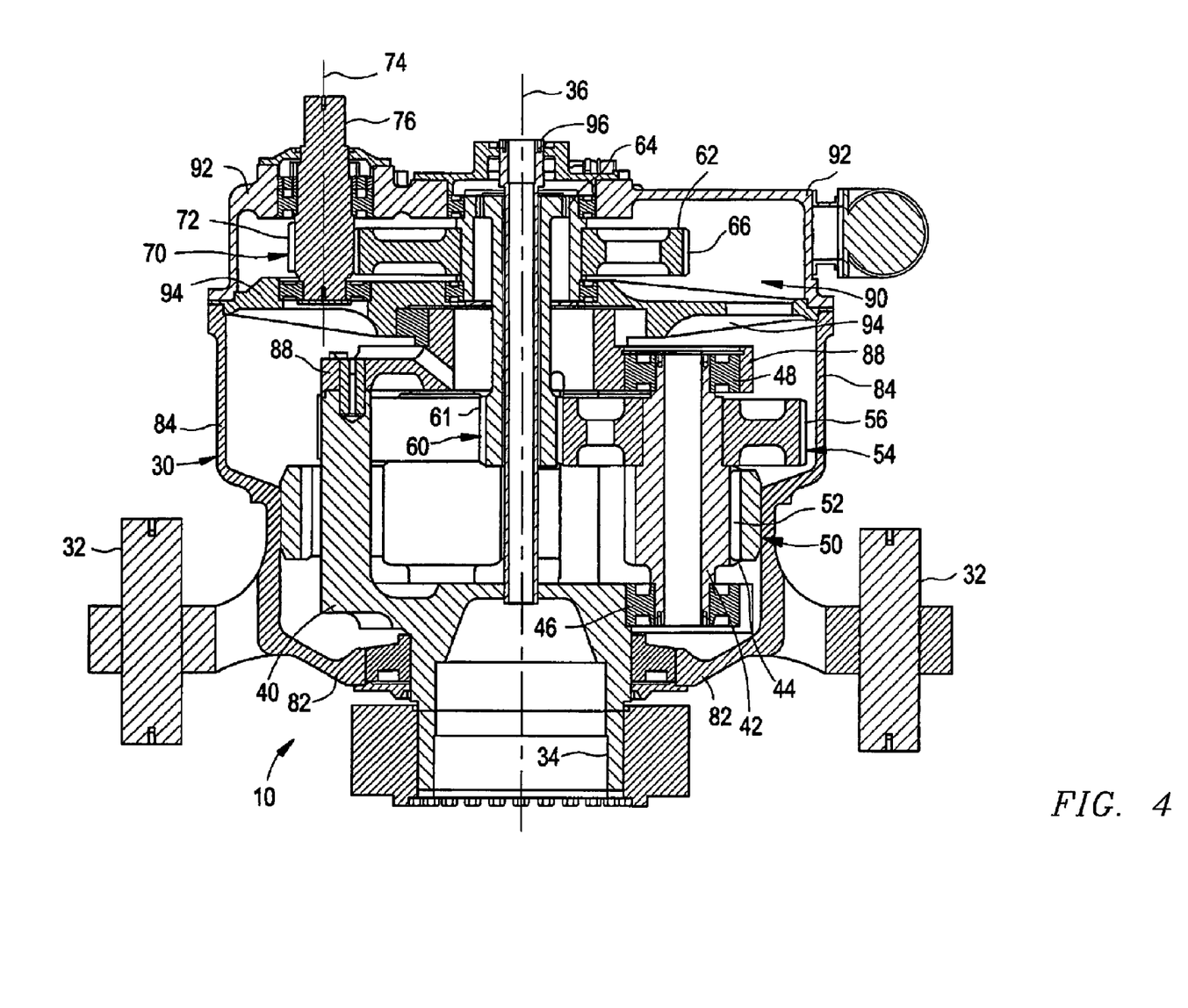
FIG. 4 is a longitudinal sectional view of the gearbox of FIG. 1.

The gearbox 10 includes a ring gear 50. The ring gear 50 is substantially fixed relative to the interior of the gearbox housing 30. That is, the ring gear 50 has external splines, which mate with splines on the interior of the housing 30, preventing the ring gear 50 from rotating relative to the housing 30. The ring gear 50 basically floats relative to the housing 30, in that it can move radially a slight amount, within the clearance between the external splines on the ring gear 50 and the internal splines on the housing 30.

As illustrated, the ring gear 50 has a diameter of about fifty inches. The planet pinions 42 are substantially smaller in diameter than the ring gear 50. The ring gear 50 has an array of internal spur or helical gear teeth 52. The internal gear teeth 52 on the ring gear 50 are in meshing engagement with the external gear teeth 44 on the planet pinions 42. As a result, orbital movement of the planet pinions 42 about the central axis 36, in response to rotation of the input hub 34 and the planet carrier 40 about the central axis, causes the planet pinions 42 to rotate about their own axes relative to the planet carrier 40. The rotational force transmitted from the rotor 20 to the input hub 34 is thus transmitted entirely to the planet pinions 42 to drive the planet pinions 42 to rotate about their own axes.

The gearbox 10 includes a plurality of planet gears 54. The number of planet gears 54 is equal to the number of planet pinions 42. In the illustrated embodiment, therefore, three planet gears 54 are provided; one is visible in the sectional view of FIG. 4.

Each of the planet gears 54 is fixed to one of the planet pinions 42 for rotation with its associated planet pinion 42. Thus, the gearbox 10 is a "compound" planetary gearbox. When the input hub 34 and the planet carrier 40 rotate, therefore, the rotational force of the input hub 34 is entirely transmitted through the planet pinions 42 to the planet gears 54 to drive the planet gears to rotate about the planet pinion axes.

The planet gears 54 are substantially larger in diameter than the planet pinions 42. Each one of the planet gears 54 has a plurality of external gear teeth 56 which, in the illustrated embodiment, are spur gear teeth. The planet gear teeth 56 may alternatively be helical gear teeth. If the planet gear teeth 56 and the planet pinion gear teeth 44 are helical, they are designed to be of generally equal but opposite inclination, so that their respective axial thrust forces cancel.

The gearbox 10 also includes a sun gear 60 mounted within the planet carrier 40, surrounded by the planet pinions 42. The sun gear 60 is radially supported by contact with the surrounding planet gears 54, for rotation of the sun gear 60 relative to the gear box housing 30 about the central axis 36. The sun gear 60 has a hollow bore along its axis, and along the axis of its shaft extension. A hollow tube 96, fixed to the final stage cover 92 on the gearbox housing 30, passes through the bore of the sun gear 60 and its shaft extension, substantially along the axis 36, to conduct control wiring (not shown) through the gear box 10 to the rotor 20. The sun gear 60 rotates relative to, but does not contact, the hollow tube 96. The sun gear 60 is substantially smaller in diameter than the planet gears 54.

The sun gear 60 has a plurality of external spur or helical gear teeth 61 that are in meshing engagement with the external gear teeth 56 on the planet gears 54. As a result, rotation of the planet gears 54 about their axes, in response to rotation of the input hub 34 and the planet pinions 42, causes the sun gear 60 to rotate about the central axis 36. The rotational force of the input hub 34 and the planet carrier 40 is thus entirely transmitted through the planet gears 54 to the sun gear 60, driving the sun gear for rotation about the central axis 36.

The gearbox 10 also includes a final stage 90, including a final stage end plate 94, the final stage cover 92, an output pinion 70, and a final stage gear 62. The final stage gear 62 is a spur or helical gear that rotates within bearings mounted to the final stage cover 92 and the final stage end plate 94. The final stage gear 62 is rotated with the sun gear 60, about the central axis 36, by a splined connection 64 at the end of the shaft extension of the sun gear 60. The splined end of the shaft extension of the sun gear 60 floats within the clearance in this splined connection to the final stage gear 62. The final stage gear 62 is substantially larger in diameter than the sun gear 60. The final stage gear 62 has a plurality of external spur or helical gear teeth 66.

The output pinion 70 has a set of external helical gear teeth 72. The output pinion 70 is supported by the final stage end plate 94 and the final stage cover 92, for rotation relative to the housing 30, about an axis 74 that extends parallel to the central axis 36. The output pinion 70 has a portion 76 that projects beyond the gearbox housing 30, for connection with the generator 26 via the output shaft 24.

The gear teeth 72 on the output pinion 70 are in meshing engagement with the external gear teeth 66 on the final stage gear 62. As a result, rotational force from the rotor 20, transmitted through the input hub 34, the planet carrier 40, the planet pinions 42, the planet gears 54, and the sun gear 60, is transmitted through the final stage gear 62 to the output pinion 70. Rotation of the output pinion 70 drives the generator 26 thereby producing electrical energy.

The gearbox 10 provides a gear reduction, which, in the illustrated embodiment, can be, for example, a 72:1 (seventy-two to one) ratio. The rotor 20 rotates in response to wind movement past the wind turbine 12 at a low speed with a high torque. The low speed, high torque input of the rotor 20 is converted by the gearbox 10 to a high speed, low torque output suitable for driving the generator 26.

Figure 5:
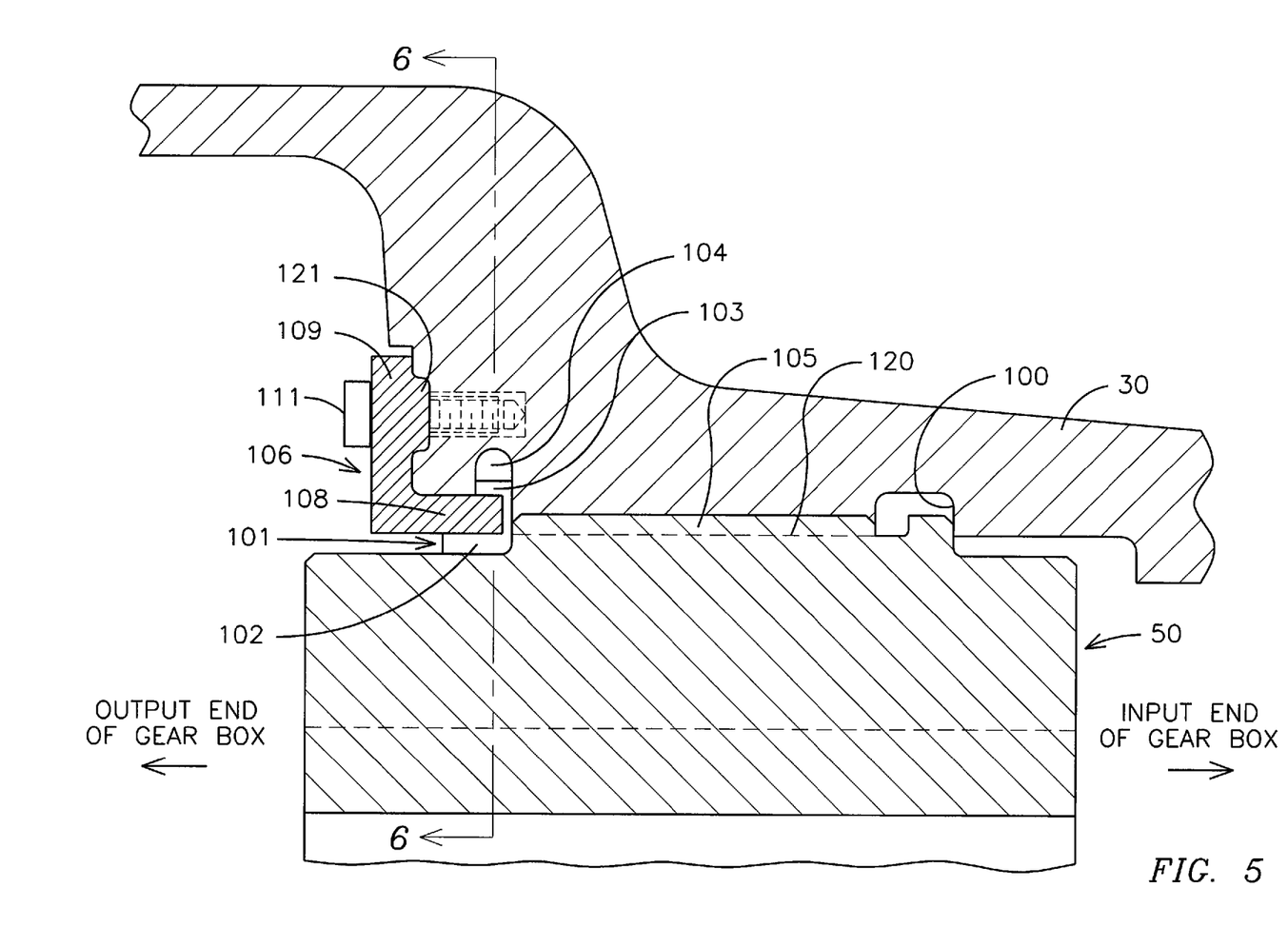
FIG. 5 is a longitudinal sectional view of the gearbox illustrating the retainer ring and keystone.

During normal operation of a wind turbine thrust or movement produced by the helical gears on the ring gear 50 and other components may cause the ring gear 50 to move in an upwind direction or toward an input end of the gearbox 10. The axial thrust or movement in this direction is reacted against the gearbox housing 30. As shown in FIG. 5, a lip 100 formed on an interior of the housing 30 may engage the ring gear 50 to restrain axial movement of the ring gear 50 in the upwind direction. More specifically, the lip 100 is formed along the internal splines 120 (represented by the dotted line) of the housing 30, extends circumferentially along the housing 30 and overlaps at least a portion of each of the external splines 105 on the ring gear 50.

During some transient events such as an electrical failure (known as a crowbar effect) or when the turbine is shut down and a brake is applied, a reversal torque or load is created causing axial thrust or movement of the ring gear 50 toward an output end of the gearbox or in the downwind direction. Accordingly, a retaining means is mounted to the gear housing 30 to restrain or minimize such downwind axial movement of the ring gear 50. In an embodiment a retainer ring 101 having a generally cross-sectional "L" shape configuration is mounted to the housing 30 adjacent to and overlapping at least a portion of the ring gear 50. The retainer ring 101 has an axial leg 102 disposed toward the output end of the gearbox 10, and a radial leg 103 abutting or adjacent the splines 105 on the ring gear 50. The radial leg portion 103 of the retainer ring 101 is wedged within a groove 104 formed in the housing 30 and held in a stationary position relative to the housing 30 by the keystone 106, as explained below in more detail.

Figure 6:
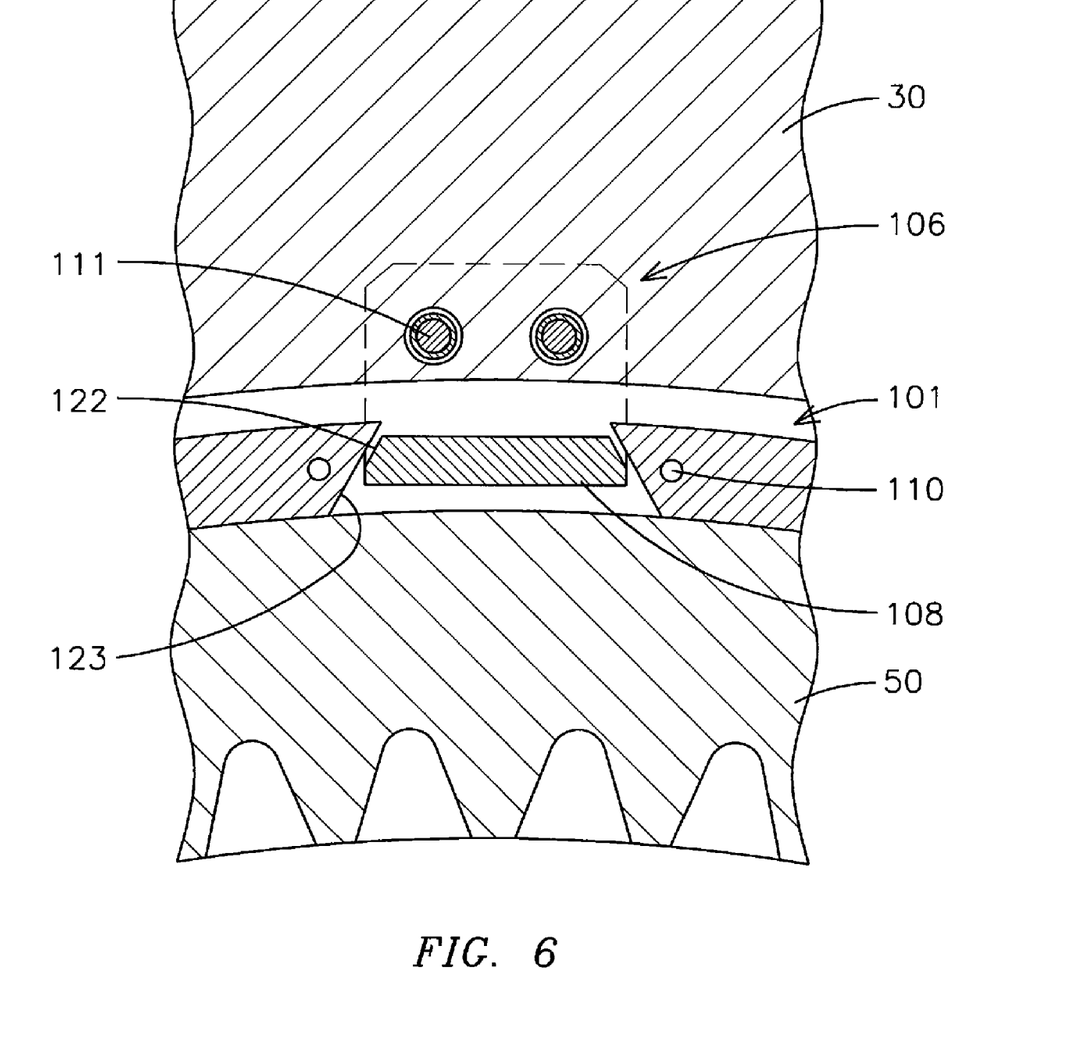
FIG. 6 is a sectional view taken along line 6-6 in FIG. 5.

With respect to FIG. 6, the retainer ring 101 is shown in an exploded view illustrating that the retainer ring 101 is circumferential or circular having two free ends 101A and 101B forming the gap 107 there between. In a gearbox 10 having a ring gear that is about fifty inches in diameter, the retainer ring may have an inside diameter of about fifty nine inches. The retainer ring 101 may have an axial width of about one inch and a radial depth of about 0.72 inches.

The retainer ring 101 is installed using a clamping device (not shown) that engages retainer ring 101 at holes 110 positioned toward respective ends 101A, 101B of the retainer ring 101. The clamping device squeezes ends 101A, 101B together so the axial leg 102 of the retainer ring 101 is inserted in groove 104. When the clamping device is released, the retainer ring 101 expands separating the ends 101A, 101B forming the gap 107.

Figure 7:
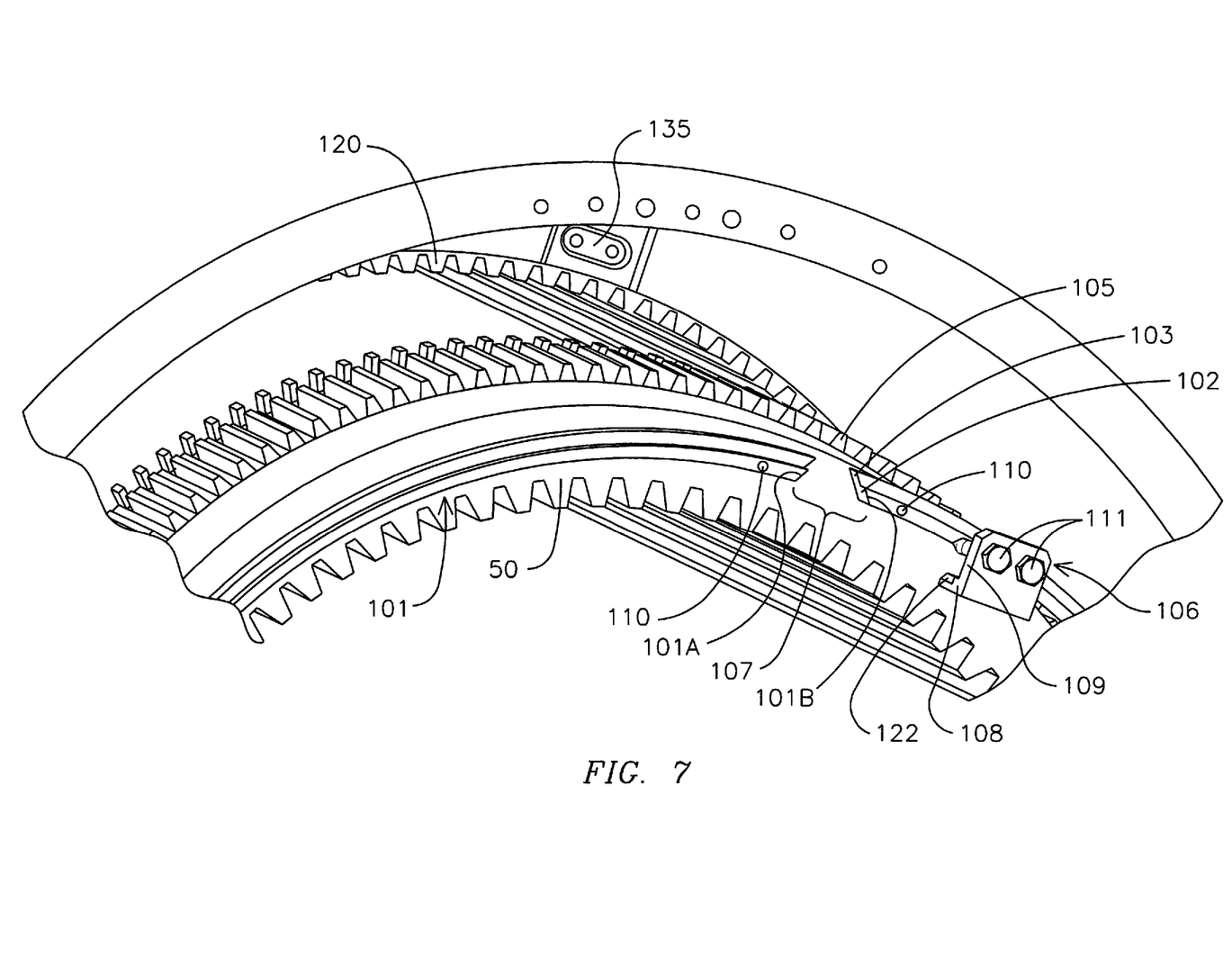
FIG. 7 is an exploded perspective view of the ring gear, retainer ring and keystone.

The keystone 106 is then inserted in the gap 107 and bolted to the housing 30. More specifically, the keystone 106 has a first or axial leg 108 disposed toward the input end of the gearbox 10 that fits within the gap 107, and a radial leg 109 that is bolted to the housing 30. As shown in FIG. 5, the housing is adapted to receive bolts 111 and portions of the radial leg 109 so the keystone 106 fits in mating relationship with the housing 30. In an embodiment, the keystone has an oval shaped protrusion 121 that fits in mating relationship with an indentation 135 on an interior of housing 30 for aligning leg 108 with the gap 107 in the retainer ring 101. As shown in FIGS. 6 and 7, the axial leg 108 of the keystone 106 has beveled surfaces 122, which when positioned within the gap 107 of the retainer and substantially parallel with the inclined surfaces 123 of the ends 101A, 101B on the retainer ring 101. In an embodiment, the angle of the inclined surfaces 123 on the retainer ring 101 relative to one another may be about sixty degrees; and, the angle of the beveled surfaces relative on one another is about sixty degrees. In this manner, the keystone 106 secures the retaining ring 101 to the housing 30, and prevents the ends 101A, 101B of the retainer ring 101 from collapsing and falling from the housing 30.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

What is claimed is:

1. A stationary wind turbine for generating electricity comprising:
    a turbine housing;
    a support pylon attached to the turbine housing for supporting the turbine housing above a ground surface;
    a turbine blade having a rotor, the turbine blade being driven by wind for rotating the rotor;
    a gearbox housed in the turbine housing; and
    an electrical power generator housed in the turbine housing;
    wherein an input of the gearbox is attached to the rotor and an output of the gearbox is attached to the electrical power generator, for converting low-speed, high-torque rotary power from the rotor, as driven by the turbine blade, to high-speed, low-torque rotary power for moving the electrical power generator to generate electricity; and the gearbox comprises:
    a gearbox housing;
    a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around the central axis, with the axes of the planet gears extending are generally parallel to the central axis of said planet carrier;

a sun gear rotatable about said central axis and engageable by said planet gears; and, means, mounted to the housing, disposed adjacent to and overlapping at least a portion of the ring gear, for restraining the axial movement of the ring gear relative to the gearbox toward an output end of the gearbox.

2. The wind turbine of claim 1 wherein the ring gear is a unitary ring gear, and wherein the gearbox housing includes a lip abutting an axial side of the ring gear opposite the restraining means, the lip restraining axial movement of the ring gear relative to the gearbox toward the input of the gearbox.

3. A planetary gearbox for a wind turbine having a turbine blade and an electrical power generator for converting low-speed, high-torque rotary power from the turbine blade to high-speed, low-torque rotary power for electrical power generation, the gearbox comprising:

a housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around the central axis, with the axes of the planet gears extending are generally parallel to the central axis of said planet carrier;

a sun gear rotatable about said central axis and engageable by said planet gears; and, means, mounted to the housing, disposed adjacent to and overlapping at least a portion of the ring gear, for restraining the axial movement of the ring gear relative to the gearbox toward an output end of the gearbox, wherein the restraining means comprises a retainer ring having a first leg fitted in mating relationship with the housing and a second leg depending therefrom and overlapping at least a portion of the ring gear, and the retainer ring having two free ends spaced apart forming a gap there between, and the retaining means also comprising a keystone mounted to the housing having a first leg disposed between the gap in the retainer ring, and a second leg attached to the first leg wherein the second leg is secured to the gearbox housing.

4. The gearbox of claim 3 wherein the retainer ring is generally circular and circumferentially overlaps at least a portion of the ring gear.

5. The gearbox of claim 3 wherein the retainer ring is disposed adjacent to the ring gear toward an output end of the gearbox.

6. The gearbox of claim 3 further comprising a circumferentially extending groove formed in an interior of the housing for receiving the first leg of the retainer ring.

7. A planetary gearbox for a wind turbine having a turbine blade and an electrical power generator for converting low-speed, high-torque rotary power from the turbine blade to high-speed, low-torque rotary power for electrical power generation, the gearbox comprising:

a housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around the central axis, with the axes of the planet gears extending are generally parallel to the central axis of said planet carrier;

a sun gear rotatable about said central axis and engageable by said planet gears;

means, mounted to the housing, disposed adjacent to and overlapping at least a portion of the ring gear, for restraining the axial movement of the ring gear relative to the gearbox toward an output end of the gearbox; and, wherein the restraining means comprises a generally circular retainer ring mounted to the housing, radially overlapping at least a portion of the ring gear and disposed toward the output end of the gearbox and the retainer ring has two free ends spaced apart forming a gap there between, and the restraining means also comprising a keystone mounted to the housing having a leg disposed within the gap in the retainer ring.

8. A planetary gearbox for a wind turbine having a turbine blade and an electrical power generator for converting low-speed, high-torque rotary power from the turbine blade to high-speed, low-torque rotary power for electrical power generation, the gearbox comprising:

a housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around the central axis, with the axes of the planet gears extending are generally parallel to the central axis of said planet carrier;

a sun gear rotatable about said central axis and engageable by said planet gears;

means, mounted to the housing, disposed adjacent to and overlapping at least a portion of the ring gear, for restraining the axial movement of the ring gear relative to the gearbox toward an output end of the gearbox; and, wherein the restraining means comprises a generally circular retainer ring mounted to the housing, radially overlapping at least a portion of the ring gear and disposed toward the output end of the gearbox and the retainer ring has two free ends spaced apart forming a gap there between, and the restraining means also comprises a keystone mounted to the housing having a first leg disposed within the gap in the retainer ring and a second leg attached to the first leg wherein the second leg is secured to the gearbox housing.

9. A stationary wind turbine for generating electricity comprising:

a turbine housing;

a support pylon attached to the turbine housing for supporting the turbine housing above a ground surface;

a turbine blade having a rotor, the turbine blade being driven by wind for rotating the rotor;

a gearbox housed in the turbine housing; and an electrical power generator housed in the turbine housing;

wherein an input of the gearbox is attached to the rotor and an output of the gearbox is attached to the electrical power generator, for converting low-speed, high-torque rotary power from the rotor, as driven by the turbine blade, to high-speed, low-torque rotary power for moving the electrical power generator to generate electricity; and wherein the gearbox comprises:

a gearbox housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around said central axis, with the axes of said planet gears extending generally parallel to said central axis of said planet carrier;

a sun gear rotatable about said central axis and engageable by said planet gears; and, a generally circular retainer ring, affixed to the a housing adjacent to the ring gear toward the output end of the gearbox and radially overlapping at least a portion of the ring gear.

10. The wind turbine of claim 9 wherein the ring gear is a unitary ring gear, and wherein the gearbox housing includes a lip abutting an axial side of the ring gear opposite the restraining means, the lip restraining axial movement of the ring gear relative to the gearbox toward the input of the gearbox.

11. A gearbox for a wind turbine having a turbine blade and an electrical power generator for converting low-speed, high-torque rotary power from the turbine blade to high-speed, low-torque rotary power for electrical power generation, the gearbox comprising:

a housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around said central axis, with the axes of said planet gears extending generally parallel to said central axis of said planet carrier;

a sun pear rotatable about said central axis and engageable by said planet gears;

a generally circular retainer ring, affixed to the a housing adjacent to the ring gear toward the output end of the gearbox and radially overlapping at least a portion of the ring gear; and, wherein the retainer ring has a first leg fitted in mating relationship with the housing and a second leg depending therefrom and overlapping at least a portion of the ring gear, and the retainer ring having two free ends spaced apart forming a gap there between, and a keystone is mounted to the housing having a first leg disposed within the gap of the retainer ring, and a second leg attached to the first leg wherein the second leg is secured to the gearbox housing.

12. A gearbox for a wind turbine having a turbine blade and an electrical power generator for converting low-speed, high-torque rotary power from the turbine blade to high-speed, low-torque rotary power for electrical power generation, the gearbox comprising:

a housing;

a ring gear substantially fixed against radial movement relative to said housing at the interior thereof;

a planet carrier mounted for rotation about a generally central axis within said ring gear and adapted to be driven at a first end thereof by the turbine blade;

a plurality of planet gears, operatively connected to the ring gear at spaced locations on said planet carrier around said central axis, with the axes of said planet gears extending generally parallel to said central axis of said planet carrier;

a sun gear rotatable about said central axis and engageable by said planet gears;

a generally circular retainer ring, affixed to the a housing adjacent to the ring gear toward the output end of the gearbox and radially overlapping at least a portion of the ring gear; and, wherein the retainer ring has two free ends spaced apart forming a gap there between, and a keystone is mounted to the housing having a leg disposed within the gap of the retainer ring.

13. The gearbox of claim 12 wherein the keystone has two opposing bevel surfaces on the leg of the keystone and each free end of the retainer ring has an inclined surface that is substantially parallel to a bevel surface on the keystone.

14. An apparatus for restraining the axial movement of a ring gear in a planetary gear assembly for a wind turbine, the apparatus comprising:

a generally circular retainer ring having two free ends spaced apart forming a gap there between; and, a keystone a portion of which is insertable within the gap of the retainer ring and is mountable in an interior of a gearbox housing.

15. The apparatus of claim 14 wherein the retainer ring comprises an axially disposed leg for affixing the retainer ring in mating relationship to the gearhousing and an integrally attached radially disposed leg for overlapping at least a portion of a ring gear.

16. The apparatus of claim 15 wherein the keystone comprises a radially disposed portion that is insertable within the gap for supporting the retainer ring against the gearbox housing.

17. The apparatus of claim 16 wherein the keystone has two opposing bevel surfaces on the radially disposed portion of the keystone and each free end of the retainer ring has an inclined surface that is substantially parallel to a bevel surface on the keystone.

* * * * *